(12) United States Patent
Schmiegel

(10) Patent No.: US 6,291,576 B1
(45) Date of Patent: Sep. 18, 2001

(54) CROSSLINKABLE FLUOROELASTOMER COMPOSITION

(75) Inventor: Walter Werner Schmiegel, Wilmington, DE (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/378,366

(22) Filed: Aug. 20, 1999

Related U.S. Application Data

(60) Provisional application No. 60/097,388, filed on Aug. 21, 1998.

(51) Int. Cl.$^7$ ........................................... C08K 3/36
(52) U.S. Cl. ..................... 524/544; 524/545; 524/546; 525/326.3; 525/384
(58) Field of Search ...................... 524/544, 545, 524/546; 525/326.3

(56) References Cited

U.S. PATENT DOCUMENTS

| | | | |
|---|---|---|---|
| 4,214,060 | 7/1980 | Apotheker et al. | 525/387 |
| 4,281,092 | 7/1981 | Breazeale | 526/247 |
| 4,478,965 | 10/1984 | Concannon et al. | 523/218 |
| 4,520,170 | 5/1985 | Kitto | 525/200 |
| 4,694,045 | 9/1987 | Moore | 525/276 |
| 5,789,509 | 8/1998 | Schmiegel | 526/247 |

FOREIGN PATENT DOCUMENTS 0361506    4/1990   (EP) .

OTHER PUBLICATIONS

Anestis L. Logothetis, *Prog. Polym. Sci.*, 14, 251–296, 1989.

*Primary Examiner*—Bernard Lipman

(57) ABSTRACT

Curable fluoroelastomer compositions comprising a fluoroelastomer, a curative for the fluoroelastomer, and a molecular sieve additive exhibit a reduced tendency to sponge during the curing process.

8 Claims, No Drawings

CROSSLINKABLE FLUOROELASTOMER COMPOSITION

CROSS REFERENCE TO RELATED APPLICATION

This application claims the benefit of U.S. Provisional Application No. 60/097,388 filed Aug. 21, 1998.

FIELD OF THE INVENTION

This invention relates to fluoroelastomers that are capable of being crosslinked without sponging.

BACKGROUND OF THE INVENTION

Elastomers are typically compounded with fillers, crosslinking agents and other additives, followed by forming or shaping into a desired product configuration. This forming may be accomplished by calendering or extrusion, but most often the forming process is carried out by compression or injection molding. After shaping, the elastomer molecules are crosslinked through the action of crosslinking agents, thereby creating a three dimensional structure that provides strength and stability. Such crosslinking, or curing, is usually effected by heat and pressure. Fluoroelastomers (i.e. elastomeric fluoropolymers) are often press cured in a first step at elevated temperature and pressure while confined in a mold, and then post cured, after removal from the mold, at elevated temperatures and ambient pressures. The post cure step serves to complete the curing process. Certain fluoroelastomer compositions have a tendency to evolve undesirable quantities of gaseous byproducts during the press cure process, resulting in a sponged product, i.e., one that contains voids. This problem is described, for example, in U.S. Pat. No. 4,520,170 with respect to perfluoroelastomers.

SUMMARY OF THE INVENTION

The present invention provides a fluoroelastomer composition that has a reduced tendency to sponge during press cure. In particular, the present invention is directed to a curable fluoroelastomer composition comprising a fluoroelastomer, a curative for the fluoroelastomer, and a molecular sieve compound.

DETAILED DESCRIPTION OF THE INVENTION

Representative crosslinkable elastomers which can be used in the present invention include fluoroelastomers comprising copolymerized units of one or more monomers containing fluorine, such as vinylidene fluoride, hexafluoropropylene, 1-hydropentafluoropropylene, 2-hydropentafluoropropylene, tetrafluoroethylene, chlorotrifluoroethylene, and perfluoro(alkyl vinyl) ether, as well as other monomers not containing fluorine, such as ethylene or propylene. Elastomers of this type are described in Logothetis, Prog. Polym. Sci., Vol. 14, 251–296 (1989).

Specific examples of such fluoroelastomers include copolymers comprising units of vinylidene fluoride and hexafluoropropylene and, optionally, tetrafluoroethylene; copolymers comprising units of vinylidene fluoride, perfluoro(alkyl vinyl) ether and tetrafluoroethylene; copolymers comprising units of tetrafluoroethylene and propylene; and copolymers comprising units of tetrafluoroethylene and perfluoro(alkyl vinyl) ether, preferably perfluoro(methyl vinyl) ether. Each of the above fluoroelastomers may optionally also include a cure site monomer. Copolymers of ethylene, tetrafluoroethylene, perfluoro(alkyl vinyl) ether and, optionally, a bromine-containing cure site monomer, such as those disclosed by Moore, in U.S. Pat. No. 4,694,045 are suitable for use in the present invention. Copolymers of tetrafluoroethylene and perfluoro(alkyl vinyl) ether commonly contain fluorinated nitrile cure sites, for example perfluoro(8-cyano-5-methyl-3,6-dioxa-1-octene) and others disclosed in U.S. Pat. No. 4,281,092 or U.S. Pat. No. 5,789,509.

Depending on their composition, fluoroelastomers are generally crosslinked by the action of curatives. Curatives include diamines; polyols, in conjunction with an accelerator such as a quaternary ammonium or phosphonium compound; or organic peroxides, in conjunction with a polyfunctional coagent. The amount of curative required will depend on the particular polymer and cure site which is present therein, but usually about 2–10 parts per hundred parts fluoroelastomer (phr) will be adequate for efficient cure. Generally about 2–15 phr of metal oxides or metal hydroxides are also present in the compounded elastomer. If fillers or carbon black are used, they are usually present in amounts of up to 65 phr.

The above described fluoroelastomers are generally cured using a two stage process. That is, the compositions are first cured in a closed mold, i.e. press cured. Then the compositions are post cured in an oven in an atmosphere of air or an inert gas. The initial cure usually takes place over a period of about 1–60 minutes at temperatures of about 145°–220° C., depending on the particular fluoroelastomer composition employed. During the initial cure, the fluoroelastomer composition is generally maintained under a pressure in the mold of about from 0 to 3500 MPa. The post cure is typically performed at ambient pressure, and temperatures of about from 125° to 300° C. for periods of about 1–24 hours.

The elastomer compositions of the present invention contain about from 0.5–15 parts per hundred parts fluoroelastomer (phr) of a molecular sieve additive. A preferred subclass includes zeolites. Molecular sieve zeolites are crystalline aluminosilicates of Group IA and Group IIA elements, such as sodium, potassium, magnesium, and calcium. They are represented by the following empirical chemical formula: $M_{2/n}O.Al_2O_3.ySiO_2.wH_2O$ where y is 2 or greater, n is the cation valence, and w represents the water contained in the voids of the zeolite. Commercially available examples of such compositions include Molecular Sieve 3A, Molecular Sieve 4A, Molecular Sieve 5A, and Molecular Sieve 13X, all available from Aldrich Chemical Co., Inc. Milwaukee, Wis. Use of this class of additives prevents sponging and improves heat aging of vulcanizates upon press curing in many instances.

Other additives may be compounded into the fluoroelastomer to optimize various physical properties. Such additives include carbon black, stabilizers, plasticizers, lubricants, pigments, fillers, and processing aids typically utilized in perfluoroelastomer compounding. Any of these additives can be incorporated into the compositions of the present invention, provided the additive has adequate stability for the intended service conditions.

Carbon black is used in elastomers as a means to balance modulus, tensile strength, elongation, hardness, abrasion resistance, conductivity, and processability of the compositions. Carbon black is generally useful in amounts of from 5–60 phr.

In addition, or in the alternative, fluoropolymer fillers may be present in the composition. Generally from 1 to 50 phr of a fluoropolymer filler is used, and preferably at least about 5 phr is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

The molecular sieve compound, crosslinking agent, optional accelerator, metal oxide, and other additives are generally incorporated into the polymer by means of an internal mixer or on a rubber mill. The resultant composition is then cured, usually by means of heat and pressure, for example by compression molding.

The curable compositions of the present invention are useful in production of gaskets, tubing, and seals. Such articles are most commonly produced by molding a compounded formulation of the curable composition with various additives under pressure, curing the part, and then subjecting it to a post cure cycle. The cured compositions of the invention exhibit a marked decrease in the tendency to sponge, compared to compositions that do not include the molecular sieve compounds.

The invention is now illustrated by certain embodiments wherein all parts and percentages are by weight unless otherwise specified.

EXAMPLES

Test Methods

Cure Characteristics

Cure characteristics were measured using a Monsanto oscillating disk rheometer (ODR), under conditions corresponding to ASTM D 2084 at 1° arc, 24 minutes, 180° C. The following cure parameters were recorded:

$M_H$: maximum torque level, in units of dN.m $M_L$: minimum torque level, in units of dN.m Delta M: difference between maximum and minimum torque, in units of dN.m $t_s2$: minutes to a 2.26 dNm rise above $M_L$ $t_c50$: minutes to 50% of maximum torque $t_c90$: minutes to 90% of maximum torque Tensile Properties Unless otherwise noted, stress/strain properties were measured on test specimens that had been press cured at 180° C. for 15 minutes and then post cured in an air oven for 24 hours at 232° C. The following physical property parameters were recorded; test methods are in parentheses:

$M_{100}$: modulus at 100% elongation in units of MPa (ISO 37)

$T_B$: tensile strength in units of MPa (ISO 37)

$T_S$: tear strength in units of dN/m (ISO 34, Die B)

$E_B$: elongation at break in units of % (ISO 37)

TR-10: temperature of retraction (ISO 2921)

According to the TR test method, a standard test piece of length 50 mm is stretched at room temperature and then cooled in a bath (usually filled with isopropanol) to a temperature of about 10° C. less than the Tg of the polymer. The test piece is then allowed to retract freely while the test temperature is raised at a rate of 1° C. per minute. Readings of the retracted length are taken every 2 minutes until the retraction reaches 75%. TR-10 is the temperature at which a retraction of 10% is achieved.

Hardness (Shore A, ISO 868)

Compression set of small cylindrical pellet samples (ISO 815)

The following polymers were used in the Examples:

Polymer A

A continuous emulsion polymerization was carried out in a well-stirred 2.0 liter stainless steel liquid full reaction vessel. The reactor was heated to 120° C. and the aqueous solution was fed at 4 L/h. The aqueous feed consisted of 2.68 g/hour (g/h) ammonium persulfate (APS), 1.4 g/h sodium hydroxide, 3.4 g/h ammonium perfluorooctanoate (FC-143), and 0.7 g/h isopropanol in deionized water. The reactor was kept liquid-full at 6.2 MPa by means of a back-pressure control valve in the effluent line. After 30 minutes, the reaction was started by introducing a gaseous monomer mixture consisting of 113.1 g/h tetrafluoroethylene (TFE), 614.1 g/h vinylidene fluoride (VF2), and 391.2 g/h perfluoro (methylvinyl) ether (PMVE) fed through a diaphragm compressor. After 15 minutes, 32.9 g/h 2-hydropentafluoropropylene (HPFP), another gaseous monomer, was added to the remainder of the gaseous mixture. After 1.5 hours, effluent dispersion was collected for 6 hours.

The effluent polymer dispersion was separated from residual monomers in a degassing vessel at atmospheric pressure. The dispersion had a pH of 4.5 and contained 22.0 weight percent solids. The fluoroelastomer was isolated from the dispersion by reducing its pH to about 3 with dilute nitric acid and coagulating with calcium nitrate solution. The coagulated polymer was allowed to settle, supernatant serum was removed, and the polymer was washed by reslurrying in the water twice before filtering. The wet crumb was dried in an air oven at approximately 50–65° C. to a moisture content of less than 1%.

About 6.7 kg of polymer was recovered at an overall conversion of 97%. The polymer had a copolymerized monomer composition of 10.09 wt. % TFE, 53.96 wt. % $VF_2$, 34.05 wt. % PMVE and 1.9 wt. % HPFP. The polymer was an amorphous elastomer with a glass transition temperature of −28° C. as determined by differential scanning calorimetry (heating mode, 10° C./min, inflection point of transition). Fluoroelastomer inherent viscosity was 0.87 dL/g, measured at 30° C. in methyl ethyl ketone, and Mooney viscosity was measured as ML-10 (121° C.)=49.

Polymer B

A continuous emulsion polymerization was carried out in a well-stirred 2.0 liter stainless steel liquid full reaction vessel. The reactor was heated to 125° C. and the aqueous solution was fed at 4 L/h. The aqueous feed consisted of 2.64 g/h ammonium persulfate (APS), 1.2 g/h sodium hydroxide, and 2.2 g/h ammonium perfluorooctanoate (FC-143) in deionized water. The reactor was kept liquid-full at 6.2 MPa by means of a back-pressure control valve in the effluent line. After 30 minutes, the reaction was initiated by introducing a gaseous monomer mixture consisting of 113.1 g/h tetrafluoroethylene (TFE), 614.1 g/h vinylidene fluoride ($VF_2$), and 391.2 g/h perfluoromethylvinyl ether (PMVE) fed through a diaphragm compressor. After 15 minutes, 32.9 g/h 2-hydropentafluoro-propylene (HPFP), another gaseous monomer, was added to the remainder of the gaseous mixture. After 1.5 hours, effluent dispersion was collected for 2.5 hours.

The effluent polymer dispersion was separated from residual monomers in a degassing vessel at atmospheric pressure. The dispersion had a pH of 4.0 and contained 21.7 weight percent solids. The fluoroelastomer was isolated from the dispersion by reducing its pH to about 3 with dilute sulfuric acid and coagulating with potassium aluminum sulfate solution. The coagulated polymer was allowed to settle, supernatant serum was removed, and the polymer was washed by reslurrying in the water twice before filtering. The wet crumb was dried in an air oven at approximately 50–65° C. to a moisture content of less than 1%.

About 2.8 kg of polymer was recovered at an overall conversion of 98%. The polymer composition was 9.99 wt. % TFE, 54.12 wt. % $VF_2$, 33.85 wt. % PMVE and 2.04 wt. % HPFP. The polymer was an amorphous elastomer with a glass transition of −29° C. as determined by differential scanning calorimetry (heating mode, 10 C./min, inflection point of transition). Fluoroelastomer inherent viscosity was 1.10 dL/g, measured at 30° C. in methyl ethyl ketone, and Mooney viscosity was measured as ML-10 (121° C.)=89.

Polymer C

Polymer C was prepared generally according to the process disclosed in U.S. Pat. No. 4,214,060. It differs from the above polymers in that the cure site monomer 4-bromo-3,3,4,4-tetrafluorobutene-1 (BTFB) was used in place of HPFP. The copolymer composition was 55 weight percent $VF_2$, 10 weight percent TFE, 34.8 weight percent PMVE and 1.2 weight percent BTFB.

Polymer D

Polymer D was prepared generally according to the process disclosed above for preparing Polymer A except that the flow rates were adjusted to produce a polymer containing 53.68 wt. % units of $VF_2$, 34.53 wt. % PMVE, 9.58 wt. % TFE and 2.21 wt. % HPFP. The polymer had a $T_g$=−28° C. and Mooney viscosity was measured as ML-10 (121° C.)=56.

Polymer E

Polymer E was prepared generally according to the process disclosed above for preparing Polymer A except that the flow rates were adjusted to produce a polymer containing 54.04 wt. % units of $VF_2$, 37.86 wt. % PMVE, 6.11 wt. % TFE and 1.98 wt. % HPFP. The polymer had a $T_g$=−28° C. and Mooney viscosity was measured as ML-10 (121° C.)=51.

Examples 1–4 and Control Example A

Samples of polymer and additives were compounded on a two-roll rubber mill according to the proportions shown in Table I. Examples 1–4 were curable compositions of this invention, while Control A was a peroxide curable composition of the prior art which, when cured, has desirable physical properties and good low temperature sealing performance.

Curing characteristics and physical properties of the cured compositions were measured according to the Test Methods and are also reported in Table I. The curable compositions of this invention, i.e. Examples 1–4, were easier to de-mold than Control A. That is, when the compositions of the invention were molded, it was not necessary to use external silicone based mold release spray to avoid sticking of the composition to the mold after 2–3 mold cycles. In contrast, demolding of the Control A compositions required mechanical removal from the mold using a tool. Physical properties of the cured compositions of Examples 1–4 were comparable to those desirable properties of the cured Control A composition, as shown in Table I.

TABLE I

| | Ex. 1 | Ex. 2 | Ex. 3 | Ex. 4 | Control A |
|---|---|---|---|---|---|
| Formulation (phr) | | | | | |
| Polymer A | 100 | 100 | — | — | — |
| Polymer B | — | — | 100 | 100 | — |
| Polymer C | — | — | — | — | 100 |
| MT Carbon Black[1] | 30 | 30 | 30 | 30 | 30 |
| Calcium Oxide VG | 6 | 6 | 6 | 6 | — |
| Calcium Hydroxide | — | — | — | — | 5 |
| Molecular sieve 13X | 3 | 3 | 3 | 3 | — |
| VPA No. 2[2] | 0.5 | 0.5 | 0.5 | 0.5 | 0.5 |
| Luperox 101 XL[3] | — | — | — | — | 4 |
| Diak #8[4] | — | — | — | — | 2 |
| TBAHS[5] | 0.5 | 0.6 | 0.5 | 0.6 | — |
| Bisphenol AF[6] | 2.5 | 3 | 2.5 | 3 | — |
| Cure Characteristics | | | | | |
| $M_L$, dNm | 4.32 | 4.09 | 7.14 | 6.92 | 10.26 |
| $M_H$, dNm | 45.6 | 50.75 | 43.86 | 55.54 | 56.84 |
| Delta M, dNm | 41.28 | 46.66 | 36.72 | 48.62 | 46.6 |
| $t_s2$, minutes | 2.72 | 2.77 | 3.22 | 3.37 | 1.8 |
| $t_c50$, minutes | 5.37 | 6.13 | 7.26 | 7.9 | 3.72 |
| $t_c90$, minutes | 12.49 | 11.8 | 18.04 | 16.15 | 7.16 |
| Stress Strain Properties | | | | | |
| $T_B$, MPa | 12.8 | 12.4 | 15.1 | 15.3 | 20.1 |
| $E_B$, % | 254 | 219 | 244 | 230 | 212 |
| $M_{100}$, MPa | 4.5 | 4.7 | 5 | 5.3 | 6.1 |
| TS, kN/m | 22.5 | 22.4 | 20.1 | 21.8 | 20.9 |
| Hardness (Shore A) | 71.5 | 73.1 | 70.7 | 72.3 | 68.7 |
| TR-10, ° C. | −26 | | −26 | | −28 |
| Compression Set | | | | | |
| @200° C., 70 hours, % | 37.5 | 38.8 | 32 | 35 | 26.2 |

[1]Thermax FF N 990 medium thermal carbon black (available from Lehmann & Voss Co.)
[2]Rice Bran Wax (available from DuPont Dow Elastomers L.L.C.)
[3]2,5-Dimethyl-2,5-di(t-butylperoxy)hexane, 45% Active (available from ELF Atochem, North America, Inc.)
[4]Trimethylallylisocyanurate (available from DuPont Dow Elastomers L.L.C.)
[5]Tetrabutylammonium hydrogen sulfate (available from DuPont Dow Elastomers L.L.C.)
[6]4,4'(Rexafluoroisopropylidene)diphenol (available from DuPont Dow Elastomers, L.L.C.)

Examples 5–6 and Control Example B

Samples of polymer and additives were compounded on a two-roll rubber mill according to the proportions shown in Table II. Examples 5–6 were curable compositions of this invention containing various amounts of molecular sieves. Control B was similar in composition, but did not contain molecular sieves.

Curing characteristics and physical properties of the cured compositions were measured according to the Test Methods and are also reported in Table II. The degree of sponging (on a scale of 1–5) was measured by monitoring bubble formation during curing. Compositions which cured with no bubble formation were rated "1", while compositions which bubbled to the extent that it was impossible to measure physical properties of the cured compositions were rated "5".

TABLE II

| Formulation (phr) | Ex. 5 | Ex. 6 | Control B |
|---|---|---|---|
| Polymer D | 50 | 50 | 50 |
| Polymer E | 50 | 50 | 50 |
| MT Carbon Black[1] | 30 | 30 | 30 |

TABLE II-continued

| Formulation (phr) | Ex. 5 | Ex. 6 | Control B |
|---|---|---|---|
| Calcium Oxide VG | 3 | 3 | 3 |
| Elastomag 170[2] | 3 | 3 | 3 |
| Molecular sieve 13X | 4.5 | 9 | 0 |
| VPA No. 2[3] | 0.5 | 0.5 | 0.5 |
| TBAHS[4] | 1 | 1 | 1 |
| Bisphenol AF[5] | 2 | 2 | 2 |
| Cure Characteristics | | | |
| $M_L$, dNm | 8.1 | 9.0 | 6.6 |
| $M_H$, dNm | 48.9 | 54.2 | 43.1 |
| Delta M, dNm | 40.8 | 45.2 | 36.5 |
| $t_s2$, minutes | 1.1 | 1.2 | 1.6 |
| $t_c50$, minutes | 1.8 | 1.8 | 1.7 |
| $t_c90$, minutes | 3.8 | 4.5 | 5.4 |
| Stress Strain Properties | | | |
| $T_B$, Mpa | 12.7 | 13.5 | 11.1 |
| $E_B$, % | 218 | 188 | 232 |
| $M_{100}$, Mpa | 4.6 | 6.6 | 3.4 |
| Hardness (Shore A) | 71.5 | 75.3 | 69.1 |
| TR-10, ° C. | −26.0 | −26.0 | −26.7 |
| Compression Set @200° C., 70 hours, % | 47.9 | 48.4 | 50.2 |
| Sponging Rating | 1 | 1 | 4 |

[1]Thermax FF N 990 medium thermal carbon black (available from Lehmann & Voss Co.)
[2]Magnesium oxide (available from Morton International)
[3]Rice Bran Wax (available from DuPont Dow Elastomers L.L.C.)
[4]Tetrabutylammonium hydrogen sulfate (available from DuPont Dow Elastomers L.L.C.)
[5]4,4'(Hexafluoroisopropylidene)diphenol (available from DuPont Dow Elastomers, L.L.C.)

What is claimed is:

1. A curable fluoroelastomer composition comprising a fluoroelastomer, a curative for the fluoroelastomer, and a molecular sieve compound.

2. The composition of claim 1 wherein the molecular sieve compound is a molecular-sieve zeolite.

3. The composition of claim 2 wherein the molecular-sieve zeolite is selected from the group consisting of crystalline aluminosilicates of Group IA and Group IIA elements.

4. The composition of claim 1 wherein the molecular sieve compound is present in an amount of from 0.5–15 parts per hundred parts fluoroelastomer.

5. The composition of claim 1 wherein the fluoroelastomer is selected from the group consisting of copolymers comprising units of vinylidene fluoride and hexafluoropropylene; copolymers comprising units of vinylidene fluoride, hexafluoropropylene, and tetrafluoroethylene; copolymers comprising units of vinylidene fluoride, a perfluoro(alkyl vinyl) ether, and tetrafluoroethylene; copolymers comprising units of tetrafluoroethylene and propylene; copolymers comprising units of ethylene, tetrafluoroethylene and a perfluoro(alkyl vinyl ether); and copolymers comprising units of tetrafluoroethylene and a perfluoro(alkyl vinyl) ether.

6. The composition of claim 1 wherein the curative for the fluoroelastomer is a polyol.

7. The composition of claim 1 wherein the curative for the fluoroelastomer is a peroxide.

8. The composition of claim 1 wherein the curative for the fluoroelastomer is a diamine.

* * * * *